(12) United States Patent
Kim (10) Patent No.: US 9,030,772 B2
(45) Date of Patent: May 12, 2015

(54) VARIABLE DATA DENSITY FOR DATA STORAGE

(75) Inventor: Tae Young Kim, Yongin-si (KR)

(73) Assignee: Seagate Technology LLC, Cupertino, CA (US)

( * ) Notice: Subject to any disclaimer, the term of this patent is extended or adjusted under 35 U.S.C. 154(b) by 49 days.

(21) Appl. No.: 13/537,006

(22) Filed: Jun. 28, 2012

(65) Prior Publication Data

US 2013/0170064 A1     Jul. 4, 2013

(30) Foreign Application Priority Data

Jun. 28, 2011   (KR) .................. 10-2011-0062709

(51) Int. Cl.
| | | |
|---|---|---|
| *G11B 5/02* | (2006.01) | |
| *G11B 27/36* | (2006.01) | |
| *G11B 5/09* | (2006.01) | |
| *G11B 27/30* | (2006.01) | |

(52) U.S. Cl.
CPC ....... *G11B 27/36* (2013.01); *G11B 5/09* (2013.01); *G11B 27/3027* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 2004/0136104 A1* | 7/2004 | Chiao et al. | 360/31 |
| 2011/0116186 A1* | 5/2011 | Jen et al. | 360/75 |

* cited by examiner

*Primary Examiner* — Muhammad N Edun
(74) *Attorney, Agent, or Firm* — Braden Katterheinrich (57) ABSTRACT

Disclosed herein are methods and apparatuses that provide for variable data density on a disc data storage medium, where the variable data density may have a circumferential definition and a radial definition. In some examples, devices and methods may include measuring a read or write performance attribute on a disc data storage medium and selectively setting a data density rate that may vary in a circumferential direction for the disc data storage medium based on the read or write performance attribute. In other examples, apparatuses can include a data storage device having a disc data storage medium and a controller configured to measure a performance attribute of the disc data storage medium and to selectively set different Bits Per Inch (BPI) for data storage within different areas of the disc.

20 Claims, 12 Drawing Sheets

S21 — Create 2D zone map formed in radial direction (a) and circumferential direction (b)

S22 — Measure OW or BER on disk surface in circumferential direction per zone

S23 — Set BPI based on calculated changed amount of OW or BER, as corrected BPI per zone S24 — When read/write operation is performed, provide BPI based on corrected BPI per zone, to corresponding zone

VARIABLE DATA DENSITY FOR DATA STORAGE

CROSS-REFERENCE TO RELATED APPLICATION

This application claims priority under 35 U.S.C. §119(a) of Korean Patent Application No. 10-2011-0062709, filed on Jun. 28, 2011, the entire disclosure of which is hereby incorporated by reference.

BACKGROUND

Embodiments of the present disclosure relate to a Bits Per Inch (BPI) control method for a disk and a hard disk drive (HDD) controlled by the same, and particularly, to a BPI control method for a disk capable of increasing a capacity and enhancing reliability by differently controlling BPI of a disk in a circumferential direction, and an HDD controlled by the same.

A hard disk drive (HDD), one of data storage devices contributes to an operation of a computer system by reading data recorded onto a disk or by recording user data onto a disk by a magnetic head.

Due to recent trends of the HDD, such as a high capacity, high density and miniaturization, a more sophisticated mechanism is required.

A recording medium of the HDD, a disk has a magnetic recording layer recorded on its surface by a thin film application method. Here, an expected capacity may become deficient and reliability may be degraded due to micro non-uniformity occurring on the disk surface. The non-uniformity may mean a physical/chemical flat degree of the disk surface.

Figure 1:
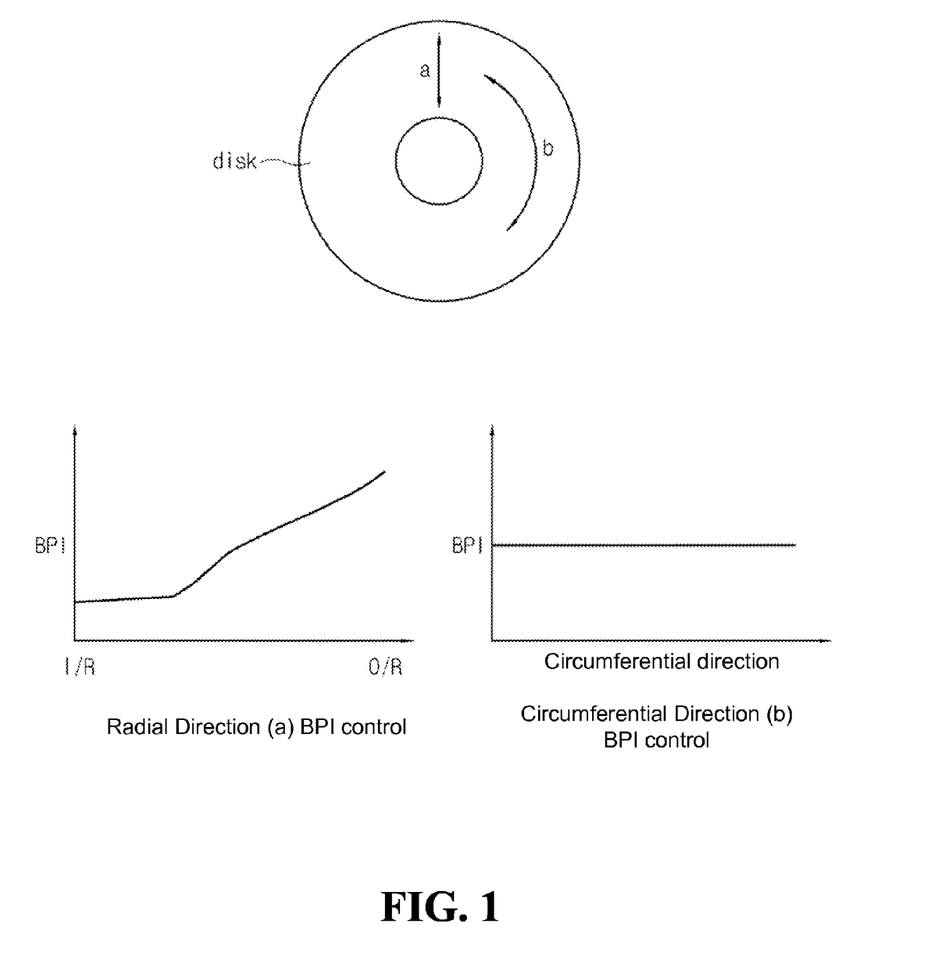
FIG. 1 is a BPI control graph with respect to a disk in accordance with the conventional art.
Figure 2:
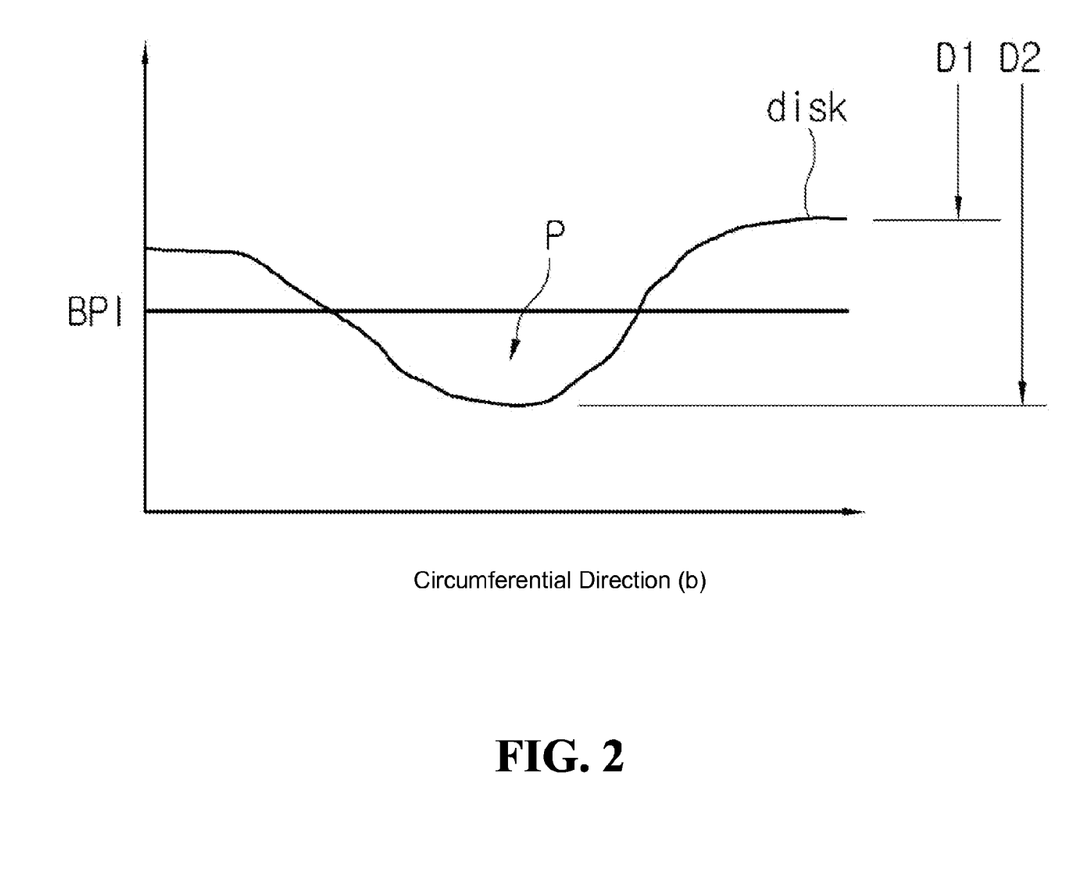
FIG. 2 is a graph schematically illustrating a correlation between a disk and BPI.

FIG. 1 illustrates a BPI control graph with respect to a disk in accordance with the conventional art, and FIG. 2 is a graph schematically illustrating a correlation between a disk and BPI.

Referring to FIG. 1, BPI of an HDD being presented to the market is differently controlled with consideration of an angular speed in a radial direction (a). That is, the HDD is controlled so that its BPI can increase towards an outer radius (OR) longer than an inner radius (IR).

In the conventional art, the HDD is controlled to have the same BPI since BPI control in a circumferential direction (b), a cylinder direction of the disk is complicated or difficult. As a result, an expected capacity may become deficient and reliability may be degraded due to micro non-uniformity occurring on the disk surface.

Referring to FIG. 2, the disk surface onto which a magnetic recording layer is recorded by a thin film application method cannot have an ideal complete planar surface. According to a flat degree, the disk surface may have a position (D1) of high read/write performance, and a position (D2) of low read/write performance. That is, the disk has a non-uniform surface (P) relatively lower than the other surface.

Such phenomenon always occurs while manufacturing a disk. As shown in FIG. 2, if the HDD is controlled to have the same BPI in a circumferential direction (b) without consideration of such phenomenon, an expected capacity may become deficient and reliability may be degraded due to the non-uniform surface (P).

To solve such problems, BPI may be decreased, which results in a large size of data. If a data size increases, an error rate during a read operation is reduced, but a capacity is lowered.

On the contrary, if BPI is increased, a data size decreases thus to increase a capacity. However, in this case, an error rate during a read operation increases.

Figure 3:
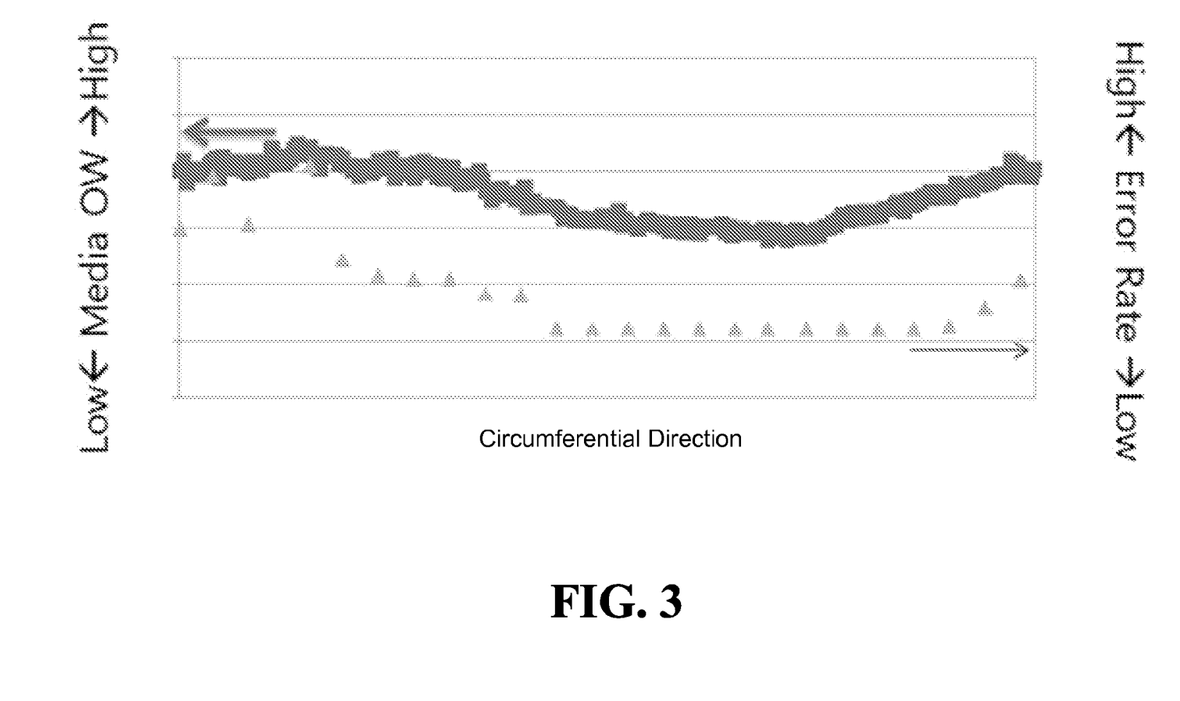
FIG. 3 is a graph illustrating Over Write (OW) on a disk surface in a circumferential direction, and a read/write error rate on a corresponding position.

FIG. 3 is a graph illustrating Over Write (OW) on the disk surface in a circumferential direction (Media OW), and a read/write error rate on a corresponding position.

Referring to FIG. 3, the OW on the disk surface, and a bit error rate (BER) on a corresponding position change in proportion to each other.

Such phenomenon may occur due to a non-uniform degree on the disk surface. This may cause degraded reliability that a reading or writing operation cannot be successfully performed on a position having low OW.

In order to solve such degraded reliability, the entire BPI applied to the HDD may be lowered, or the OW on the disk surface may be increased. In this case, the HDD may have a decreased capacity, and may have degraded productivity due to a reduced yield.

As aforementioned, the HDD has different read/write performance due to non-uniformity on the disk surface. However, if the HDD is controlled to have the same BPI on the surface in a circumferential direction like in the conventional art, a capacity may become deficient and reliability may be degraded. Therefore, a new solution is absolutely required.

SUMMARY

Disclosed herein are methods and apparatuses that provide for variable data density on a disc data storage medium, where the variable data density may have a circumferential definition and a radial definition. In some examples, apparatuses and methods may include measuring a read or write performance attribute on a disc data storage medium and selectively setting a data density rate that may vary in a circumferential direction for the disc data storage medium based on the read or write performance attribute. In other examples, apparatuses can include a data storage device having a disc data storage medium and a controller configured to measure a performance attribute of the disc data storage medium and to selectively set different Bits Per Inch (BPI) for data storage within different areas of the disc.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION

Description will now be given in detail of the exemplary embodiments, with reference to the accompanying drawings. For the sake of brevity with reference to the drawings, the same or equivalent components will be provided with the same reference numbers, and a detailed description thereof will not be repeated.

An aspect of the embodiments described herein is to provide a BPI control method for a disk capable of increasing a capacity and enhancing reliability by differently controlling Bits Per Inch (BPI) of a disk in a circumferential direction, and an HDD controlled by the same. The embodiments disclosed herein are capable of increasing a capacity and enhancing reliability by differently controlling BPI of a disk in a circumferential direction, based on a read/write performance difference due to non-uniformity on the disk surface.

To achieve these and other advantages as embodied and broadly described herein, there is provided a BPI control method for a disk, the method comprising: (a) measuring read/write performance on a disk surface in a circumferential direction; and (b) differently setting the BPI on the disk surface based on the measured read/write performance.

In step (a), Over Write (OW) or Bit Error Rate (BER) on the disk surface in a circumferential direction may be measured.

In step (b), target OW or BER preset based on a BPI reference value on the disk surface in a circumferential direction, may be compared with OW or BER measured per servo signal, thereby calculating a changed amount of the OW or the BER. Then, BPI based on the calculated changed amount of the OW or the BER may be set as corrected BPI per servo signal.

The method may further comprise, when a read/write operation is performed as the HDD operates, providing BPI based on corrected BPI per servo signal, to a corresponding servo signal.

The corrected BPI may be stored in a BPI table.

In step (b), BPI based on a changed amount of OW or BER measured per zone may be set as corrected BPI per zone, said each zone obtained by dividing the disk in a radial direction or a circumferential direction.

The method may further comprise, when a read/write operation is performed as the HDD operates, providing BPI based on corrected BPI per zone, to a corresponding zone.

To achieve these and other advantages as embodied and broadly described herein, there is also provided a hard disk drive (HDD), comprising: a disk having a magnetic recording layer recorded on its surface; a head stack assembly (HSA) having a magnetic head for writing or reading data onto/from the disk; and a controller configured to measure a read/write performance on the disk surface in a circumferential direction, and to differently set Bits Per Inch (BPI) of the disk surface based on the measured read/write performance.

The read/write performance may be Over Write (OW) or Bit Error Rate (BER) on the disk surface in a circumferential direction.

The controller may calculate a changed amount of OW or BER, by comparing target OW or BER preset based on a BPI reference value on the disk surface in a circumferential direction, with OW or BER measured per servo signal. Then, the controller may control BPI based on the calculated changed amount of the OW or the BER to be set as corrected BPI per servo signal.

When a read/write operation is performed as the HDD operates, the controller may provide BPI based on corrected BPI per servo signal, to a corresponding servo signal.

The controller may control BPI based on a changed amount of OW or BER measured per zone, to be set as corrected BPI per zone, said each zone obtained by dividing the disk in a radial direction or a circumferential direction.

When a read/write operation is performed as the HDD operates, the controller may provide BPI based on corrected BPI per zone, to a corresponding zone.

The embodiments disclosed herein may have the following advantages.

Since BPI on the disk in a circumferential direction may be differently controlled based on a read/write performance difference due to non-uniformity on the disk surface, a capacity can be increased and reliability can be enhanced.

Further scope of applicability of the present application will become more apparent from the detailed description given hereinafter. However, it should be understood that the detailed description and specific examples, while indicating some embodiments, are given by way of illustration only, since various changes and modifications within the scope of the embodiments will become apparent to those skilled in the art from the detailed description.

Figure 4:
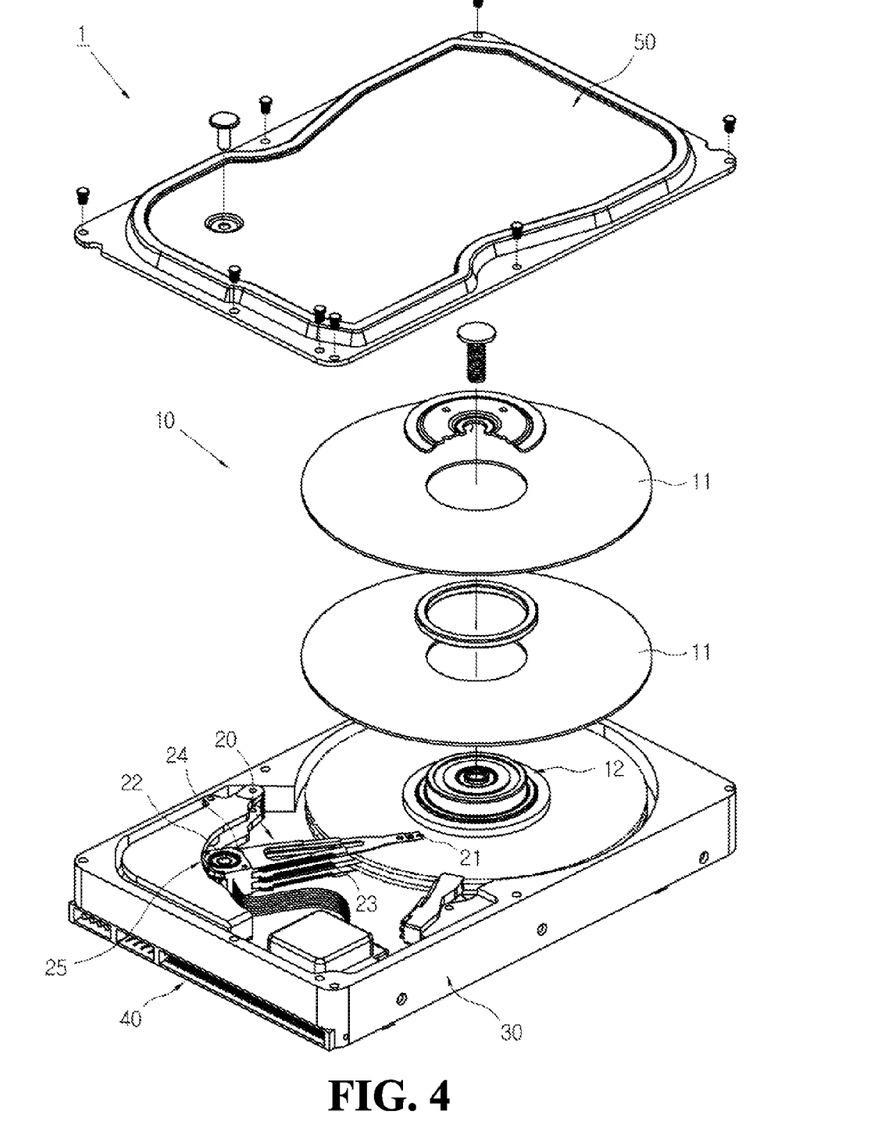
FIG. 4 is a partial disassembled perspective view of an HDD to which a BPI control method for a disk according to a first embodiment.

FIG. 4 is a partial disassembled perspective view of an HDD to which a BPI control method for a disk according to a first embodiment.

Referring to FIG. 4, the HDD 1 according to the first embodiment may comprise a disk pack 10 including a disk 11 configured to record and store data, and a spindle motor 12 configured to support and rotate the disk 11; a head stack assembly (HSA) 20 configured to read data on the disk 11; a base 30 onto which the above components are assembled; a printed circuit board assembly (PCBA) 40 coupled to a lower part of the base 30, and configured to control each type of components by mounting circuitry components onto a printed circuit board (PCB); and a cover 50 configured to cover the base 30.

The head stack assembly 20 is a carriage for writing (recording) data onto the disk 11, or reading out data on the disk 11. Such HSA is also referred to as an actuator.

The HSA 20 includes a magnetic head 21 for recording data onto the disk 11 or reading out data on the disk 11, an actuator arm 23 which moves or pivots with respect to the disk 11 around a pivot shaft 22 as a pivoting center so that the magnetic head 21 can access data on the disk 11, a pivot shaft holder 24 configured to rotatably support the pivot shaft 22, and to which the actuator arm 23 is coupled for support, and a bobbin (not shown) disposed at the pivot shaft holder 24 in the opposite direction to the actuator arm 23, and on which a voice coil motor (VCM) coil (not shown) is wound so as to be located between magnets.

The magnetic head 21 is configured to detect a magnetic field formed on the surface of the disk 11, or to read or write data on the rotating disk 11 by magnetizing the surface of the disk 11. Such magnetic head 21 is categorized into a read head for reading data on a track, and a write head for writing data onto a track.

The voice coil motor 25 is a type of driving motor for rotating the actuator arm 23 so that the magnetic head 21 can be moved to a desired position on the disk 11. More specifically, the voice coil motor 25 is operated according to Fleming's left-hand rule, whereby a force is generated when current flows in a conductive body existing in a magnetic field. That is, the voice coil motor 25 pivots a bobbin by applying a force to the bobbin upon applying current to a VCM coil located between magnets. Under this configuration, the actuator arm 23 extending from the pivot shaft holder 24 in the opposite direction to the bobbin rotates, and the magnetic head 21 supported by an end portion of the actuator arm 23 moves on the rotating disk 11 in a radial direction. The magnetic head 21 searches for one or more tracks while moving on the disk 11 in a radial direction, and accesses information. The accessed information is signal-processed.

The PCBA 40 may include a controller 42 (refer to FIG. 8) configured to control each type of components and to control a BPI on the disk 11 in a circumferential direction, and one or more memories (not shown) configured to store therein a BPI table.

Figure 5:
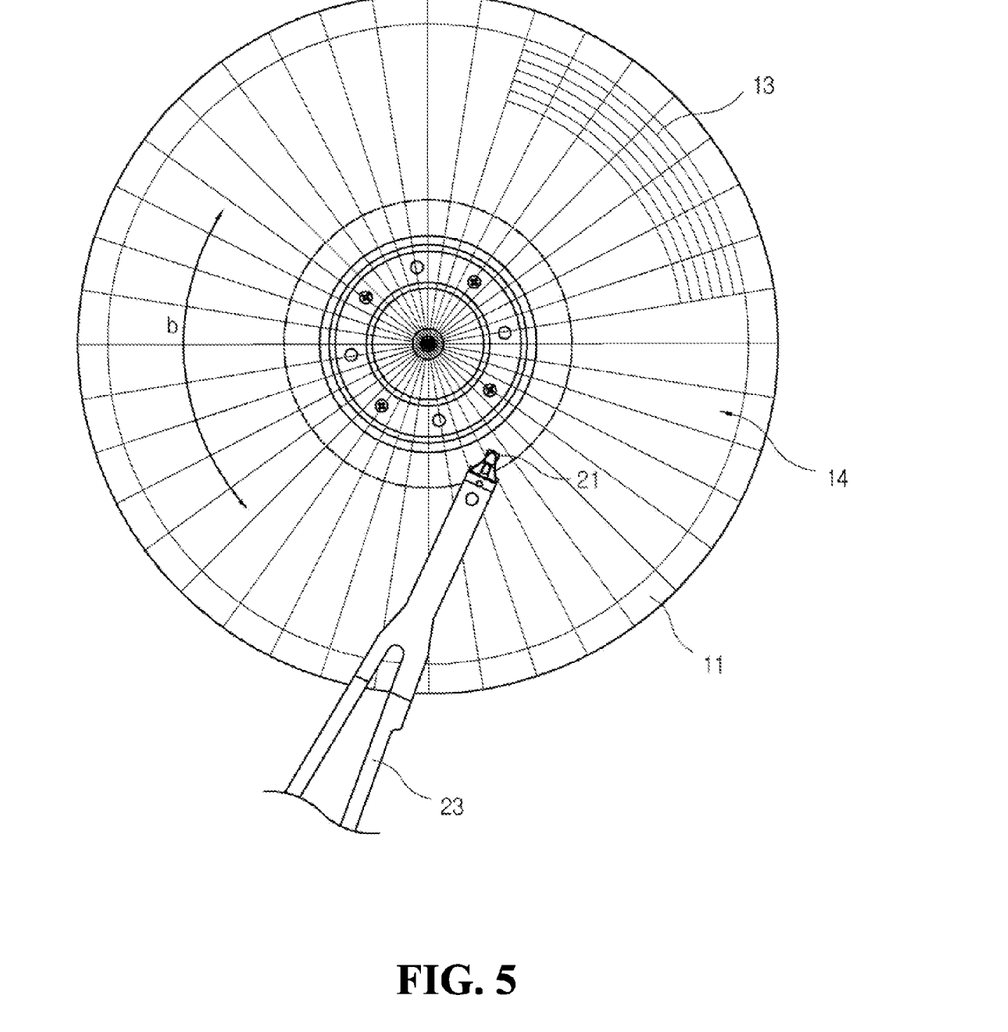
FIG. 5 is a schematic planar view of a disk region.
Figure 6:
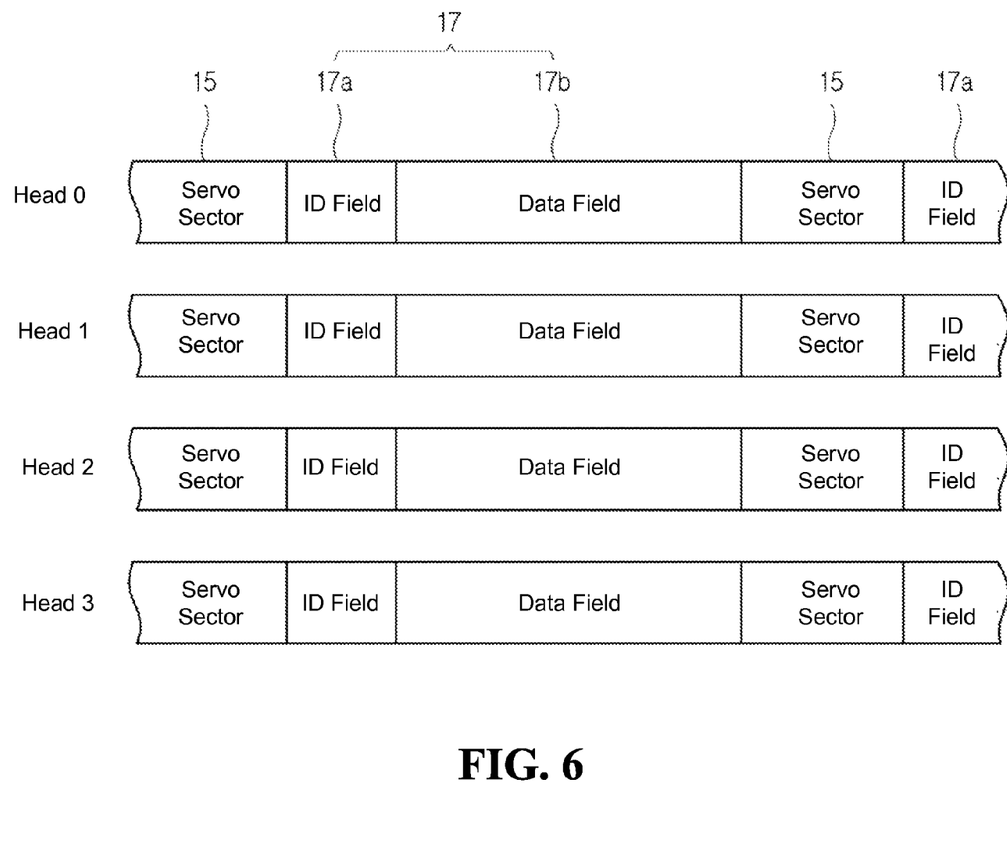
FIG. 6 is a view illustrating a data format of each track.
Figure 7:
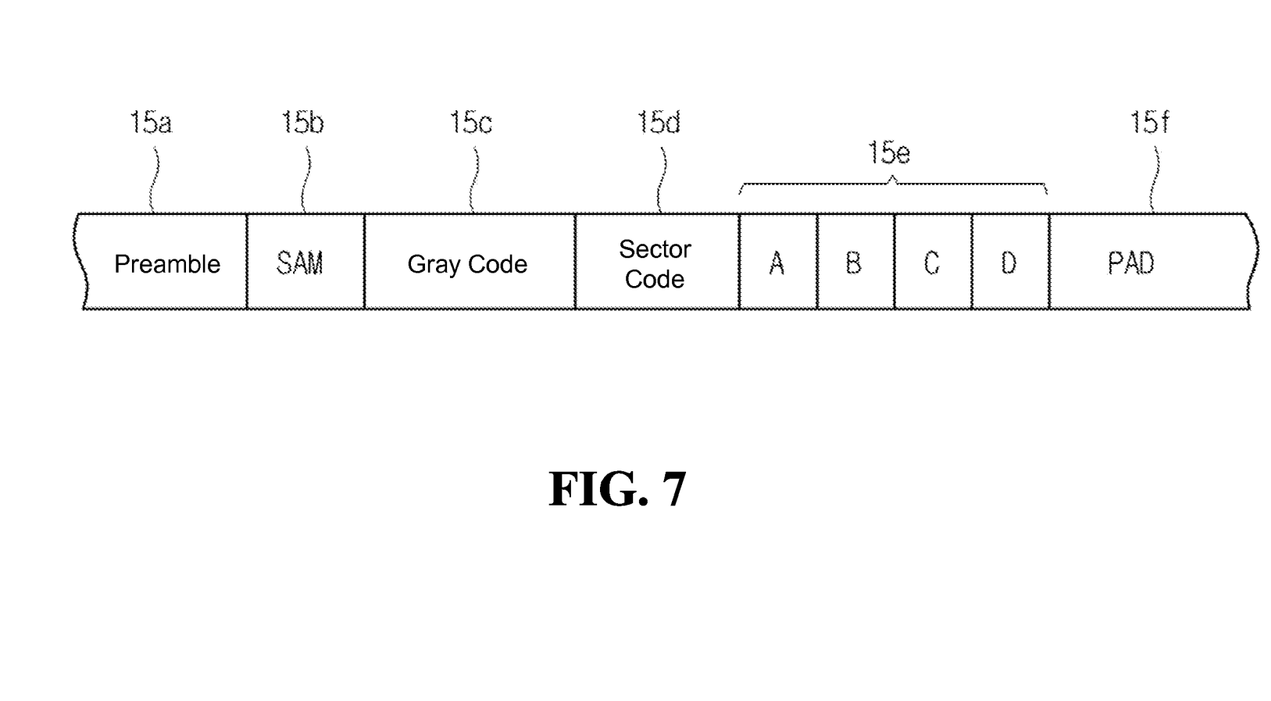
FIG. 7 is a view illustrating a detailed configuration of a servo sector.

FIG. 5 is a schematic planar view of a disk region, FIG. 6 is a view illustrating a data format of each track, and FIG. 7 is a view illustrating a detailed configuration of a servo sector.

As shown in FIG. 5, the disk 11 for recording data thereon includes tracks 13 serving as an object for storing servo information and data information, and sectors 14 in the form of unit objects and obtained by dividing the track 13 at the same interval on the basis of a rotation shaft center.

As shown in FIG. 6, a servo sector 15 to which a servo signal for servo controls such as track seeking or track following is applied, and a data sector 17 for recording a user's data are alternately disposed on each track 13.

As shown in FIG. 7, each servo sector 15 includes a preamble 15a, a Servo Address Mark (SAM) 15b, a gray code 15c, a sector code 15d, burst signals A, B, C and D 15e, and a PAD 15f.

The preamble 15a is configured to provide a clock synchronization when reading servo information according to a servo signal, and to provide a gap in front of the servo sector for indication of the servo sector. The preamble 15a is also called as servo sync. The SAM 15b is configured to inform start of a servo, and to provide synchronization for reading the subsequent gray code 15c. That is, the SAM 15b serves as a reference point for generating each type of timing pulses associated with servo controls. The gray code 15c provides information on each track 13, i.e., track information. The sector code 15d provides a sector number. The burst signals A, B, C and D 15e provide position Error Signals (PES) required for track search. And, the PAD 15f provides a transition margin from the servo sector to the data sector.

The data sector 17 is positioned before and after the servo sector 15. And, the data sector 17 is categorized into an ID field 17a and a data field 17b.

Header information for identifying a corresponding data sector is recorded on the ID field 17a. And, digital data desired by a user is recorded on the data field 17b.

Figure 8:
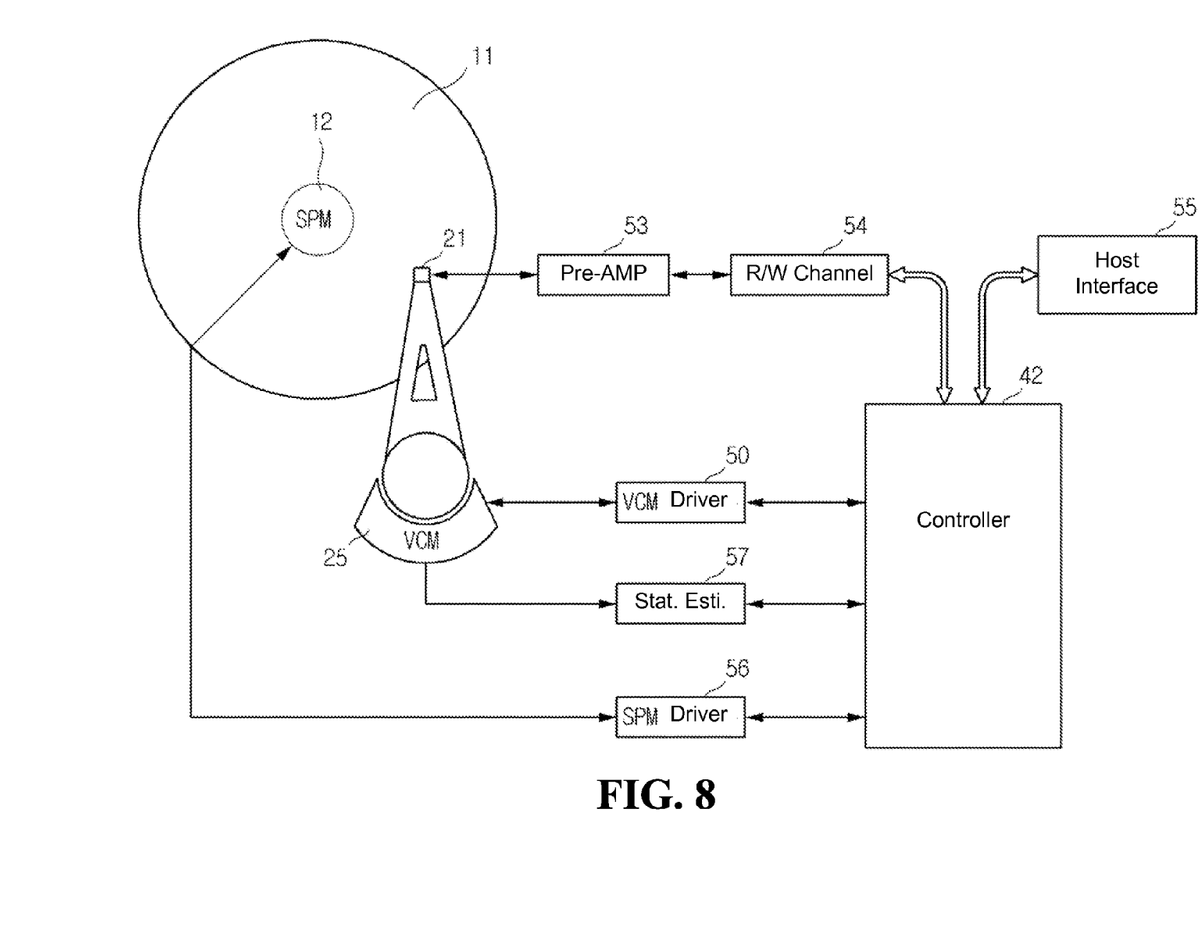
FIG. 8 is a schematic control block diagram of the HDD shown in FIG. 4.

FIG. 8 is a schematic control block diagram of the HDD shown in FIG. 4.

Referring to FIG. 8, the HDD 1 according to one embodiment includes a preamp 53, a read/write channel 54, a host interface 55, a VCM driver 50, an SPM driver 56, a status estimator 57, and a controller 42.

The preamp (pre-AMP) 53 is configured to record data on the disk 11 by amplifying a data signal reproduced from the disk 11 by the magnetic head 21, or by amplifying recording current converted by the read/write channel 54 by the magnetic head 21.

The read/write channel 54 is configured to convert a signal amplified by the preamp 53 into a digital signal, and to transmit the digital signal to a host device (not shown) via the host interface 55. Alternatively, the read/write channel 54 is configured to receive a user input data via the host interface 55, to convert the received data into a binary data stream which can be easily recorded, and to input the binary data stream to the preamp 53.

The host interface 55 is configured to transmit digital signal-converted data to the host device. Alternatively, the host interface 55 is configured to receive a user input data from the host device, and to input the received user input data to the read/write channel 54 by the controller 42.

The VCM driver 50 is configured to control the amount of current applied to the voice coil motor 25 by receiving a control signal of the controller 42.

The SPM driver 56 is configured to control the amount of current applied to the spindle motor 12 by receiving a control signal of the controller 42.

The status estimator 57 is configured to estimate a status variable value of a movement of the magnetic head 21, such as a position, a speed and control input information of the magnetic head 21, based on a status equation indicated by Position Error Signal (PES).

The controller 42 of the HDD 1 is configured to control BPI on the disk 11 in a circumferential direction.

More specifically, the controller 42 controls BPI on the surface of the disk 11 in a circumferential direction (b) to be differently set, whereas BPI on the surface of the disk 11 in a circumferential direction (b) (refer to FIG. 5) is set to be equal in the conventional art.

As aforementioned, since the disk surface is non-uniform, a read/write performance difference occurs in a circumferential direction (b). With consideration of such phenomenon, the controller 42 controls BPI on the disk surface in a circumferential direction to be differently set based on a measured read/write performance.

The read/write performance, i.e., the read/write characteristics may be various factors. Hereinafter, it is assumed that the read/write performance is OW (Over Write) or BER (Bit Error Rate) on the disk surface in a circumferential direction. The OW on the disk surface in a circumferential direction may indicate a successful degree of data writing, and the BER on the disk surface in a circumferential direction may indicate an error rate during a read operation.

The controller 42 compares target OW or BER preset based on a BPI reference value of the disk surface in a circumferential direction, with OW or BER measured per servo signal, thereby calculating a changed amount of the OW or the BER. Then, the controller 42 controls BPI based on the calculated changed amount of the OW or the BER to be set as corrected BPI per servo signal.

The BPI reference value is predefined while manufacturing the disk 11. In the conventional art, a BPI reference value is used without a change, resulting in capacity deficiency and reliability degradation.

When a read/write operation is performed as the HDD 1 operates, the controller 42 provides BPI based on corrected BPI per servo signal, to a corresponding servo signal.

More specifically, the OW and the BER on the disk surface in a circumferential direction are substantially proportional to each other (refer to FIG. 3). Accordingly, on the disk surface having low OW, BPI is lowered to reduce an error rate and to enhance reliability. On the other hand, on the disk surface having high OW, BPI is increased to enhance a capacity. Once BPI is increased, a capacity can be increased due to a reduced data size.

As BPI on the disk surface in a circumferential direction can be differently set, a capacity can be increased and reliability can be enhanced.

Such operation of the controller 42 will be explained in more details with reference to FIG. 9.

Figure 9:
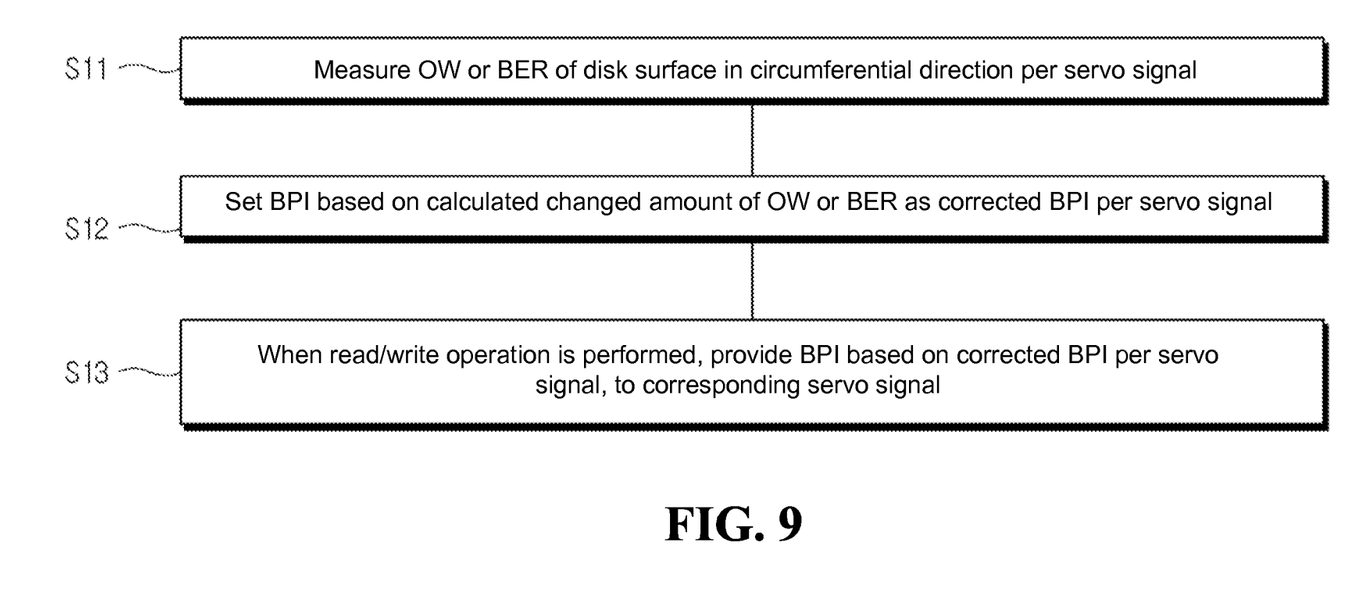
FIG. 9 is a flowchart illustrating a BPI control method for a disk in a circumferential direction.

FIG. 9 is a flowchart illustrating a BPI control method for a disk in a circumferential direction.

Firstly, OW or BER of the disk surface in a circumferential direction is measured per servo signal (S11).

As the measured information is recorded, distributions of the OW or the BER of the disk surface in a circumferential direction can be checked. Here, the OW or the BER may be OW or BER per unit sector on the disk surface in a circumferential direction.

Then, a changed amount of OW or BER is calculated, by comparing target OW or BER preset based on a BPI reference value of the disk surface in a circumferential direction, with OW or BER measured per servo signal. Then, BPI based on the calculated changed amount of the OW or the BER is set as corrected BPI per servo signal (S12).

Next, S12 will be explained in more details.

More specifically, while a subsequent servo signal is being read from a servo signal having a value lower than that of target OW or BER preset based on a BPI reference value, i.e., while each sector is being read in a circumferential direction, OW or BER is measured in a state where BPI is decreased into a value lower than the BPI reference value. Such process may be repeatedly performed.

On the contrary, while a subsequent servo signal is being read from a servo signal having a value higher than that of target OW or BER, OW or BER is measured in a state where BPI is increased into a value higher than the BPI reference value. Such process may be also repeatedly performed.

If a changed amount of OW or BER is calculated by comparing such measured OW or BER with target OW or BER preset based on a BPI reference value, corrected BPI based on the changed amount of the OW or BER can be obtained. The corrected BPI can be set as corrected BPI per servo signal.

Here, the corrected BPI may be a BPI reference value, or may be larger or smaller than the BPI reference value. Alternatively, the corrected BPI may be stored in a memory or in a maintenance region of the disk 11 in the form of a BPI table.

Then, when a read/write operation is performed as the HDD 1 operates, the controller 42 provides BPI based on corrected BPI on the BPI table, per servo signal, to a corresponding servo signal (S13).

In the preferred embodiment, since BPI on the disk 11 in a circumferential direction can be differently controlled based on a read/write performance difference due to non-uniformity on the disk surface, a capacity can be increased and reliability can be enhanced.

Figure 10:
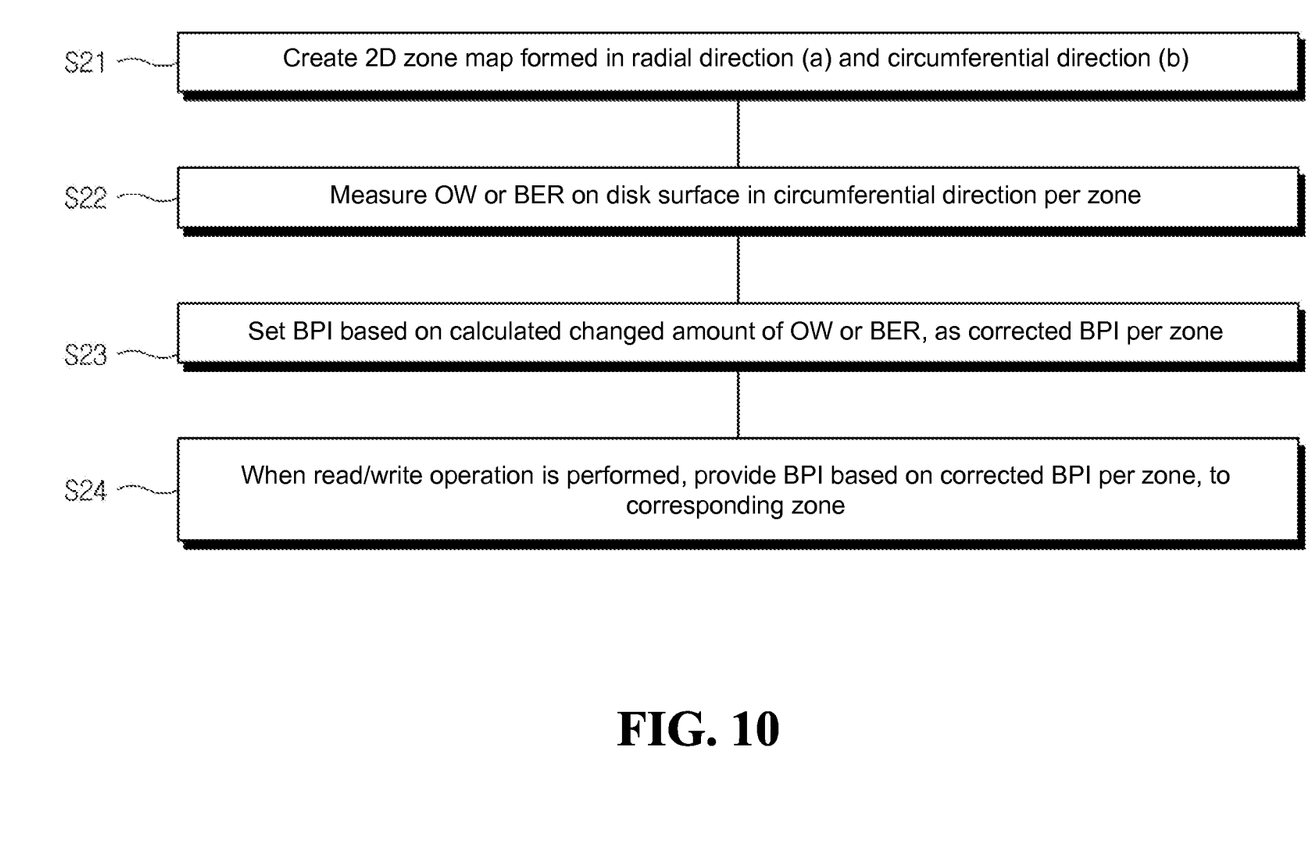
FIG. 10 is a flowchart illustrating a BPI control method for a disk in a circumferential direction according to a second embodiment.
Figure 11:
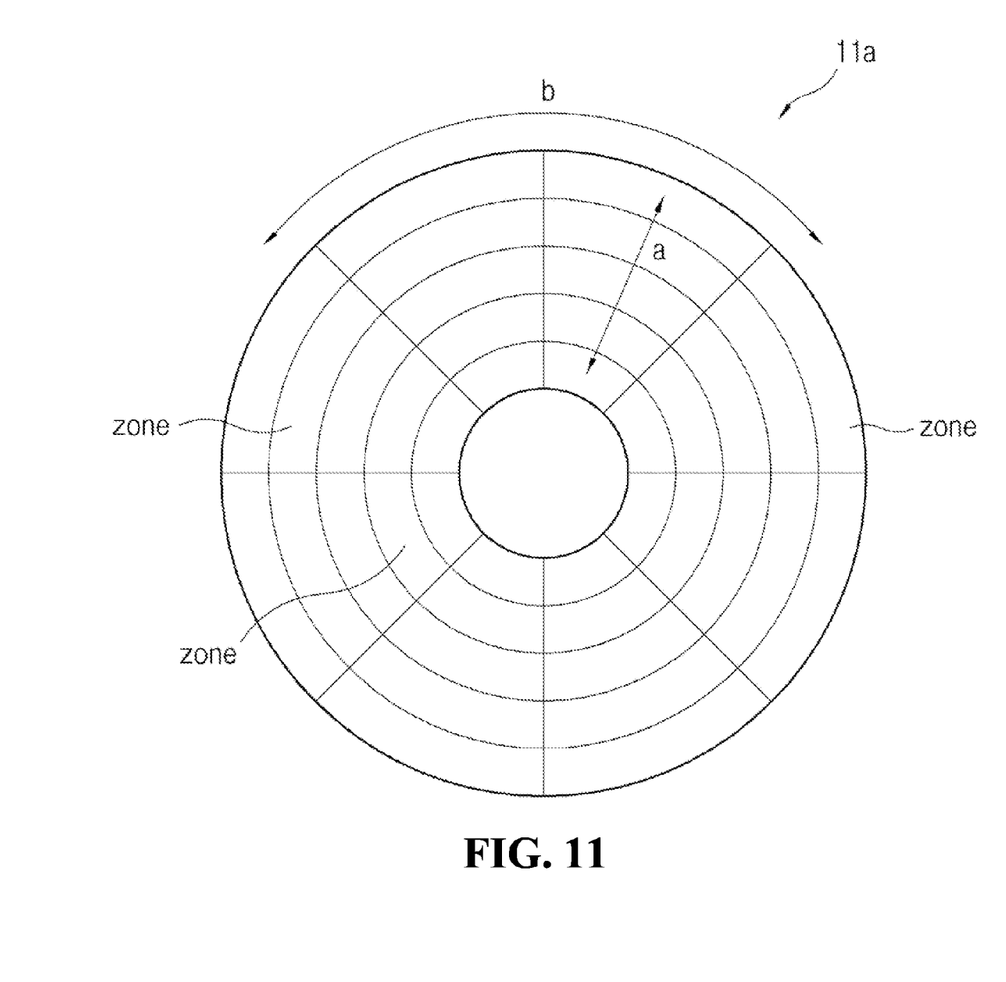
FIG. 11 is a schematic planar view of a disk region to which the control method of FIG. 10 is applied.

FIG. 10 is a flowchart illustrating a BPI control method for a disk in a circumferential direction according to a second embodiment, and FIG. 11 is a schematic planar view of a disk region to which the control method of FIG. 10 is applied.

As shown in FIG. 11, BPI of a disk 11*a* in a circumferential direction is differently controlled by dividing the disk 11*a* in the form of a two-dimensional (2D) zone map formed in a radial direction (a) and a circumferential direction (b). A plurality of zones are regularly disposed on the zone map of FIG. 11.

Referring to FIG. 10, a 2D zone map (refer to FIG. 11) formed in a radial direction (a) and a circumferential direction (b) is created (S21).

Then, OW or BER on the surface of the disk 11*a* in a circumferential direction is measured per zone (S22). The measured information is recorded to allow OW or BER distribution to be checked on the disk surface in a circumferential direction.

Then, BPI based on a changed amount of OW or BER obtained per zone is set as corrected BPI, said each zone obtained by dividing the disk 11*a* in a radial direction or a circumferential direction (S23).

When a read/write operation is performed as the HDD 1 operates, the controller 42 provides BPI based on corrected BPI on the BPI table, per zone, to a corresponding zone (S24). Here, the same BPI is provided to all the positions inside a corresponding zone.

Figure 12:
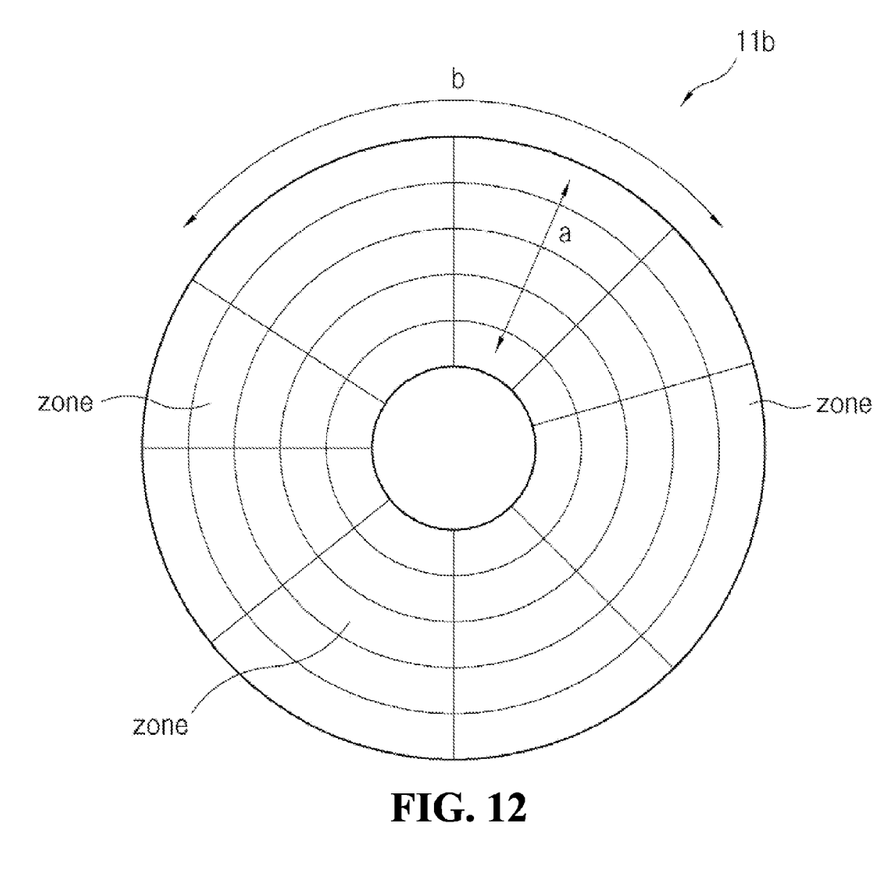
FIG. 12 is a schematic planar view of a disk region to which a BPI control method for a disk according to a third embodiment.

FIG. 12 is a schematic planar view of a disk region to which a BPI control method for a disk according to a third embodiment.

In FIG. 11, zones on a zone map are regularly divided from each other. However, in case of a disk 11*b* of FIG. 12, zones on a zone map are irregularly divided from each other. The embodiment disclosed herein may be also applied to FIG. 12.

One embodiment may be a method comprising (a) measuring read/write performance on a disk surface in a circumferential direction, and (b) differently setting BPI on the disk surface in a circumferential direction based on the measured read/write performance. An embodiment may also include wherein in step (a), Over Write (OW) or Bit Error Rate (BER) on the disk surface in a circumferential direction is measured. An embodiment may also include wherein in step (b), target OW or BER preset based on a BPI reference value of the disk surface in a circumferential direction, is compared with OW or BER measured per servo signal thus to calculate a changed amount of the OW or the BER, and then BPI based on the calculated changed amount of the OW or the BER is set as corrected BPI per servo signal. An embodiment may further comprise, when a read/write operation is performed as the HDD operates, providing BPI based on corrected BPI per servo signal, to a corresponding servo signal. An embodiment may also include wherein the corrected BPI is stored in a BPI table. An embodiment may also include, wherein in step (b), BPI based on a changed amount of OW or BER measured per zone is set as corrected BPI per each zone, said each zone obtained by dividing the disk in a radial direction or a circumferential direction. An embodiment may further comprise, when a read/write operation is performed as the HDD operates, providing BPI based on corrected BPI per zone, to a corresponding zone.

In another embodiment, a device may comprise a disk having a magnetic recording layer recorded on its surface, a head stack assembly (HSA) having a magnetic head for writing or reading data onto/from the disk, and a controller configured to measure read/write performance on the disk surface in a circumferential direction, and to differently set Bits Per Inch (BPI) of the disk surface based on the measured read/write performance. An embodiment may also include, wherein the read/write performance is Over Write (OW) or Bit Error Rate (BER) on the disk surface in a circumferential direction. An embodiment may also include, wherein the controller is configured to calculate a changed amount of OW or BER, by comparing target OW or BER preset based on a BPI reference value of the disk surface in a circumferential direction, with OW or BER measured per servo signal, and then the controller is configured to control BPI based on the calculated changed amount of the OW or the BER to be set as corrected BPI per servo signal. An embodiment may also include, wherein when a read/write operation is performed as the HDD operates, the controller provides BPI based on corrected BPI per servo signal, to a corresponding servo signal. An embodiment may also include, wherein the controller is configured to control BPI based on a changed amount of OW or BER measured per zone, to be set as corrected BPI per zone, said each zone obtained by dividing the disk in a radial direction or a circumferential direction. An embodiment may also include, wherein when a read/write operation is performed as the HDD operates, the controller provides BPI based on corrected BPI per zone, to a corresponding zone.

The foregoing embodiments and advantages are merely exemplary and are not to be construed as limiting the inventive concepts herein. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
   measuring a read or write performance attribute on a disc data storage medium; and
   selectively setting a data density rate that varies in a circumferential direction of a same track of the disc data storage medium based on the read or write performance attribute.

2. The method of claim 1, wherein the read or write performance attribute is an Over Write (OW) indicating a successful degree of writing data.

3. The method of claim 1, wherein the read or write performance attribute is a Bit Error Rate (BER) indicating an error rate in reading data.

4. The method of claim 1, wherein the performance attribute is measured per sections of the disc data storage medium during writing or reading of data by a controller to the disc data storage medium.

5. The method of claim 4, wherein the sections of the disc data storage medium are areas between servo signals stored on tracks of the disc data storage medium.

6. The method of claim 4, wherein the sections of the disc data storage medium is multiple zones having both a radial size and a circumferential size, and the method further comprises creating a zone map of the disc designating the zone locations.

7. The method of claim 4, further comprising storing the data density rate for the sections of the disc data storage medium in a data density table.

8. The method of claim 1, wherein setting the data density rate comprises comparing the measured read or write performance attribute against a reference data density rating to calculate the data density rate and selectively setting a data density for selected sections based on the comparing.

9. The method of claim 8, wherein the sections comprise zones within data wedges, wherein multiple data wedges are defined on the disc data storage medium in a circumferential direction, each of the multiple data wedges extending from an inner diameter of the disc data storage medium to an outer diameter of the disc data storage medium, and each of the multiple data wedges includes multiple zones having at least one track each, wherein the method further includes selectively setting a determined data density for at least one specific zone while not setting the determined data density for all zones.

10. The method of claim 9, wherein the at least one specific zone is in a specific data wedge, and the method further includes setting the determined data density for the least one specific zone while not setting the determined data density for all zones within the specific data wedge.

11. An apparatus comprising:
   a data storage device including:
   a disc data storage medium having multiple tracks; and
   a controller configured to measure a performance attribute of the disc data storage medium and to selectively set different Bits Per Inch (BPI) for data storage within different portions of at least one track based on the performance attribute.

12. The apparatus of claim 11, wherein the performance attribute is a Bit Error Rate (BER) indicating an error rate associated with a specific portion of the disc data storage medium.

13. The apparatus of claim 12, further comprising when a read operation is performed as the data storage device operates during normal use, the controller measures the BER and determines a modified BPI based on the BER for a corresponding portion of the data storage medium, and the controller implements the modified BPI.

14. The apparatus of claim 11, wherein the performance attribute is measured per multiple sections of the disc data storage medium.

15. The apparatus of claim 14, wherein the sections of the disc data storage medium include multiple zones having both a radial definition that is smaller than a radius of the disc data storage medium and a circumferential definition that is smaller than a circumference of the disc data storage medium, and the method further comprises creating a zone map of the disc designating the zone locations.

16. The apparatus of claim 14, further comprising storing a data density rate for the sections of the disc data storage medium in a table.

17. The apparatus of claim 11, wherein a selected BPI is set per section of the disc data storage medium between servo signals stored on the multiple tracks.

18. The apparatus of claim 11, wherein setting the data density rate comprises comparing a measured performance attribute against a threshold and selectively setting a data density for selected sections based on the threshold.

19. The apparatus of claim 18, wherein the sections comprise zones within data wedges, wherein multiple data wedges are defined on the disc data storage medium in a circumferential direction, each of the multiple data wedges extending from an inner diameter of the disc data storage medium to an outer diameter of the disc data storage medium, and each of the multiple data wedges includes multiple zones having at least one track each, wherein the method further includes selectively setting a determined data density for at least one specific zone while not setting the determined data density for all zones.

20. The apparatus of claim 19, wherein the at least one specific zone is in a specific data wedge, and the method further includes setting the determined data density for the least one specific zone while not setting the determined data density for all zones within the specific data wedge.

* * * * *